United States Patent
Vasseur et al.

(10) Patent No.: US 9,350,635 B2
(45) Date of Patent: May 24, 2016

(54) EFFICIENT NETWORK PROBING FOR DETERMINISTIC WIRELESS NETWORKS

(71) Applicant: Cisco Technology, Inc., San Jose, CA (US)

(72) Inventors: Jean-Philippe Vasseur, Saint Martin d'Uriage (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 14/041,278

(22) Filed: Sep. 30, 2013

(65) Prior Publication Data

US 2015/0023186 A1    Jan. 22, 2015

Related U.S. Application Data

(60) Provisional application No. 61/847,642, filed on Jul. 18, 2013.

(51) Int. Cl.
 *H04L 12/26* (2006.01)
 *H04L 12/24* (2006.01)

(52) U.S. Cl.
 CPC ............. *H04L 43/10* (2013.01); *H04L 43/103* (2013.01); *H04L 41/0896* (2013.01); *H04L 43/04* (2013.01); *H04L 43/06* (2013.01)

(58) Field of Classification Search
 USPC ........................................................ 370/252
 See application file for complete search history.

(56) References Cited

U.S. PATENT DOCUMENTS

| 6,442,608 | B1 | 8/2002 | Knight et al. |
| 7,567,577 | B2 | 7/2009 | Thubert et al. |
| 2004/0073650 | A1* | 4/2004 | Nakamura ................... 709/223 |
| 2005/0259664 | A1* | 11/2005 | Vasseur et al. ........... 370/395.52 |
| 2006/0007870 | A1* | 1/2006 | Roskowski et al. ........... 370/252 |
| 2012/0117268 | A1 | 5/2012 | Shaffer et al. |

(Continued)

FOREIGN PATENT DOCUMENTS

| WO | WO2009/009349 | * | 1/2009 |
| WO | WO 2009/009349 A2 | | 1/2009 |

OTHER PUBLICATIONS

Cisco et al. (hereinafter referred as Cisco) (Path Computation Element (PCE) based architecture; Aug. 2006; 41 pages.*

(Continued)

*Primary Examiner* — Ian N Moore
*Assistant Examiner* — Mewale Ambaye
(74) *Attorney, Agent, or Firm* — Parker Ibrahim & Berg LLC; James M. Behmke; Stephen D. LeBarron

(57) ABSTRACT

In one embodiment, a device (e.g., path computation device) informs a network management device of a plurality of possible probing profiles, where nodes of a computer network receive the plurality of possible probing profiles from the network management device. Based on determining that particular information is desired from one or more particular nodes of the nodes of the computer network, the device may then select one or more particular probing profiles of the plurality of possible probing profiles based on the particular information, and instructs the one or more particular nodes to probe one or more particular destination nodes according to the one or more particular probing profiles.

19 Claims, 13 Drawing Sheets

(56) References Cited

U.S. PATENT DOCUMENTS

| | | |
|---|---|---|
| 2012/0331094 A1* | 12/2012 | Hoffman et al. .............. 709/217 |
| 2013/0019005 A1 | 1/2013 | Hui et al. |
| 2013/0028106 A1 | 1/2013 | Frost |
| 2013/0031253 A1 | 1/2013 | Hui et al. |

OTHER PUBLICATIONS

Andersson, et al., "Guidelines for the Use of the "OAM" Acronym in the IETF", Request for Comments 6291, Jun. 2011, 9 pages, The Internet Engineering Task Force Trust.

Farrel, et al., "A Path Computation Element (PCE)-Based Architecture", The Internet Society, Network Working Group, Request for Comments 4655, Aug. 2006, 41 pages.

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Path Computation Element (PCE) Communication Protocol (PCEP)", IETF Trust, Network Working Group, Request for Comments 5440, Mar. 2009, 87 pages.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Increasing Network Resource Optimization Based on Operations Administration and Maintenance Information", U.S. Appl. No. 61/847,642, filed Jul. 18, 2013, 9 pages, U.S. Patent and Trademark Office, Alexandria, VA.

Vigoureux, et al., "Requirements for Operations, Administration, and Maintenance (OAM) in MPLS Transport Networks", Request for Comments 5860, May 2010, 17 pages, The Internet Engineering Task Force Trust.

Winter, et al., "RPL: IPv6 Routing Protocol for Low-Power and Lossy Networks", Request for Comments 6550, Mar. 2012, 157 pages, Internet Engineering Task Force Trust.

International Search Report dated Nov. 5, 2014 issued in connection with PCT/US2014/046606.

Thubert, P. et al.: "An Architecture for IPv6 over the TSCH mode of IEEE", IEEE802.15.4e; draft-thubert-6tisch-architecture-00.txt.; Internet Engineering Task Force, IETF; Standard Working Draft, Internet Society (ISOC), 4, rue des Falaises CH-1205, Geneva, Switzerland, Oct. 10, 2013, pp. 1-18.

Zhu, Y. et al.: "A Lightweight Policy System for Body Sensor Networks", IEEE Transactions on Network and Service Management, IEEE, US, vol. 6, No. 3, Sep. 1, 2009, pp. 137-148.

* cited by examiner

| PROBING PROFILE ID 610 | PROBING PROFILE 620 |
|---|---|
| ID "A" | PROFILE "A" |
| ID "B" | PROFILE "B" |
| ... | ... |
| ID "N" | PROFILE "N" |

TABLE 600

EFFICIENT NETWORK PROBING FOR DETERMINISTIC WIRELESS NETWORKS

RELATED APPLICATION

The present application claims priority to U.S. Provisional Application No. 61/847,642, filed Jul. 18, 2013, by Vasseur et al., the contents of which are hereby incorporated by reference.

TECHNICAL FIELD

The present disclosure relates generally to computer networks, and, more particularly, to efficient network probing, especially for deterministic wireless networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

As more and more uses for LLNs are being deployed, such as in the industrial space, determinism of the network communications and their standardization is becoming a primary point of focus within the networking community. In particular, deterministic networking refers to networks that can guarantee the delivery of packets within a bounded time. Generally, this relates to achieving characteristics such as guaranteed delivery, fixed latency, and jitter close to zero (e.g., micro seconds to tens of milliseconds depending on application). Achieving these characteristics within the architecture of an LLN, however, is not trivial, due to the constrained nature of LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
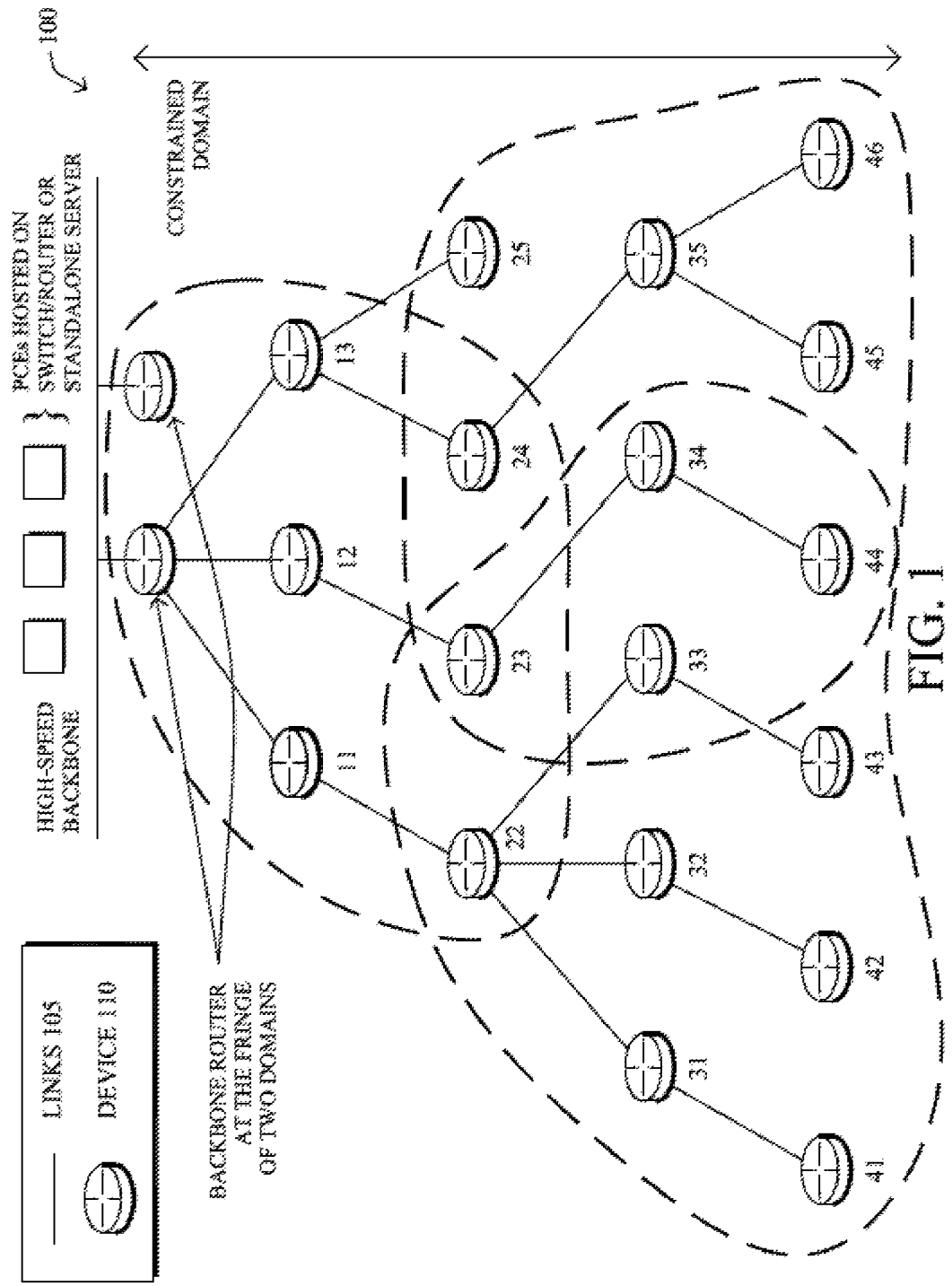
FIG. 1 illustrates an example communication network.

According to one or more embodiments of the disclosure, a device (e.g., path computation device) informs a network management device of a plurality of possible probing profiles, where nodes of a computer network receive the plurality of possible probing profiles from the network management device. Based on determining that particular information is desired from one or more particular nodes of the nodes of the computer network, the device may then select one or more particular probing profiles of the plurality of possible probing profiles based on the particular information, and instructs the one or more particular nodes to probe one or more particular destination nodes according to the one or more particular probing profiles.

According to one or more additional embodiments of the disclosure, a node registers with a network management device, and receives, during the registering, a plurality of possible probing profiles from the network management device. Upon receiving instructions from a path computation device to probe one or more particular destination nodes according to one or more particular probing profiles of the plurality of possible probing profiles, the node may then probe the one or more particular destination nodes according to the one or more particular probing profiles of the instructions.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "backbone," "11," "12," ... "46," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. Also, as shown, the backbone devices may connect the nodes of the network to a backbone network, such as via a dedicated wireless link or wired connection, where the backbone network may be proprietary and/or public (e.g., the Internet), and may contain various resources such as servers, switches, routers, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" backbone node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
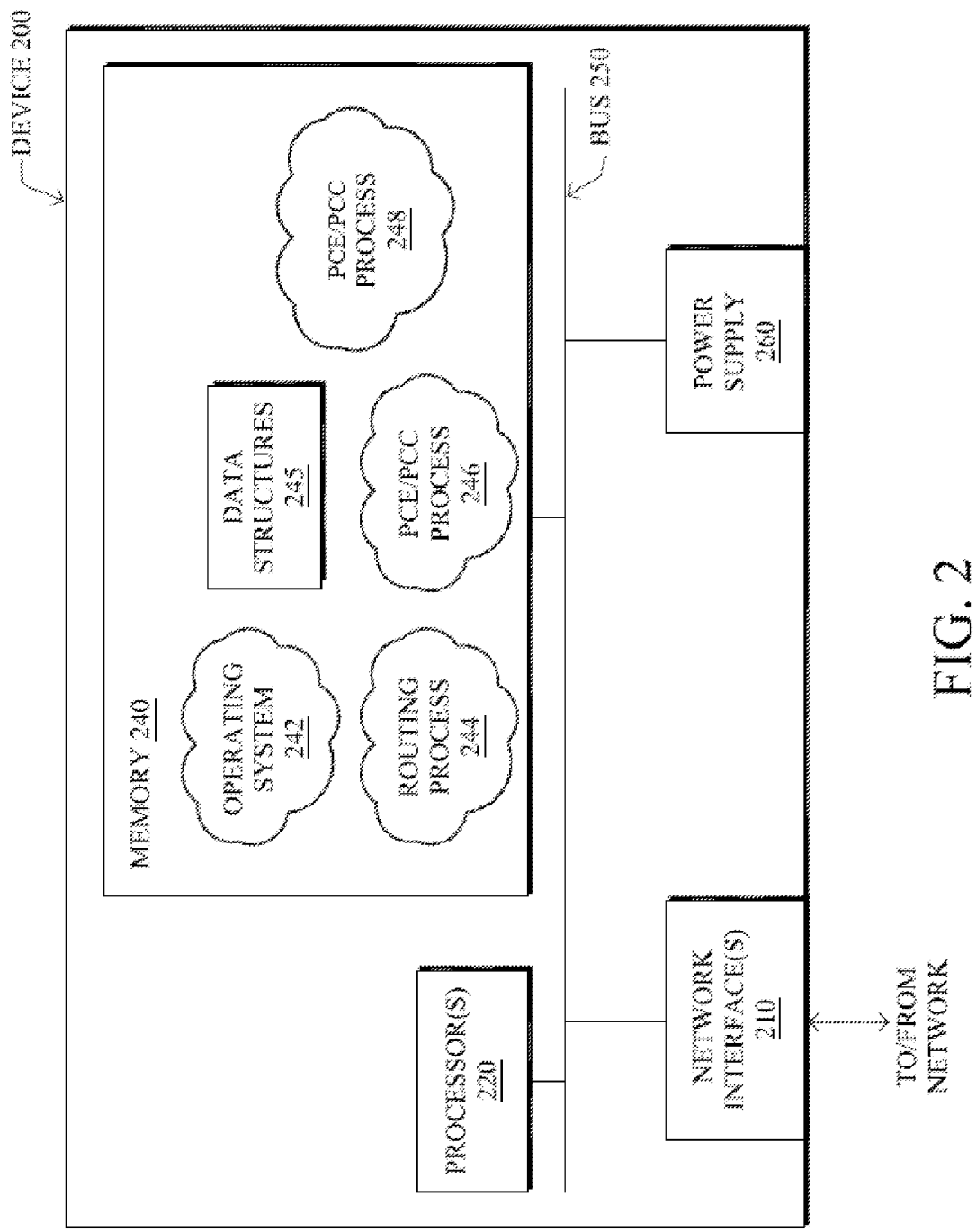
FIG. 2 illustrates an example network device/node.

FIG. 2 is a schematic block diagram of an example node/device 200 that may be used with one or more embodiments described herein, e.g., as any of the nodes 110 or servers (e.g., path computation elements or "PCEs") shown in FIG. 1 above. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a "PCE/PCC" process 246, and an illustrative probing process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive (or reactive) routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" (or "Internet of Everything") network. Loosely, the term "Internet of Things" or "IoT" (or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
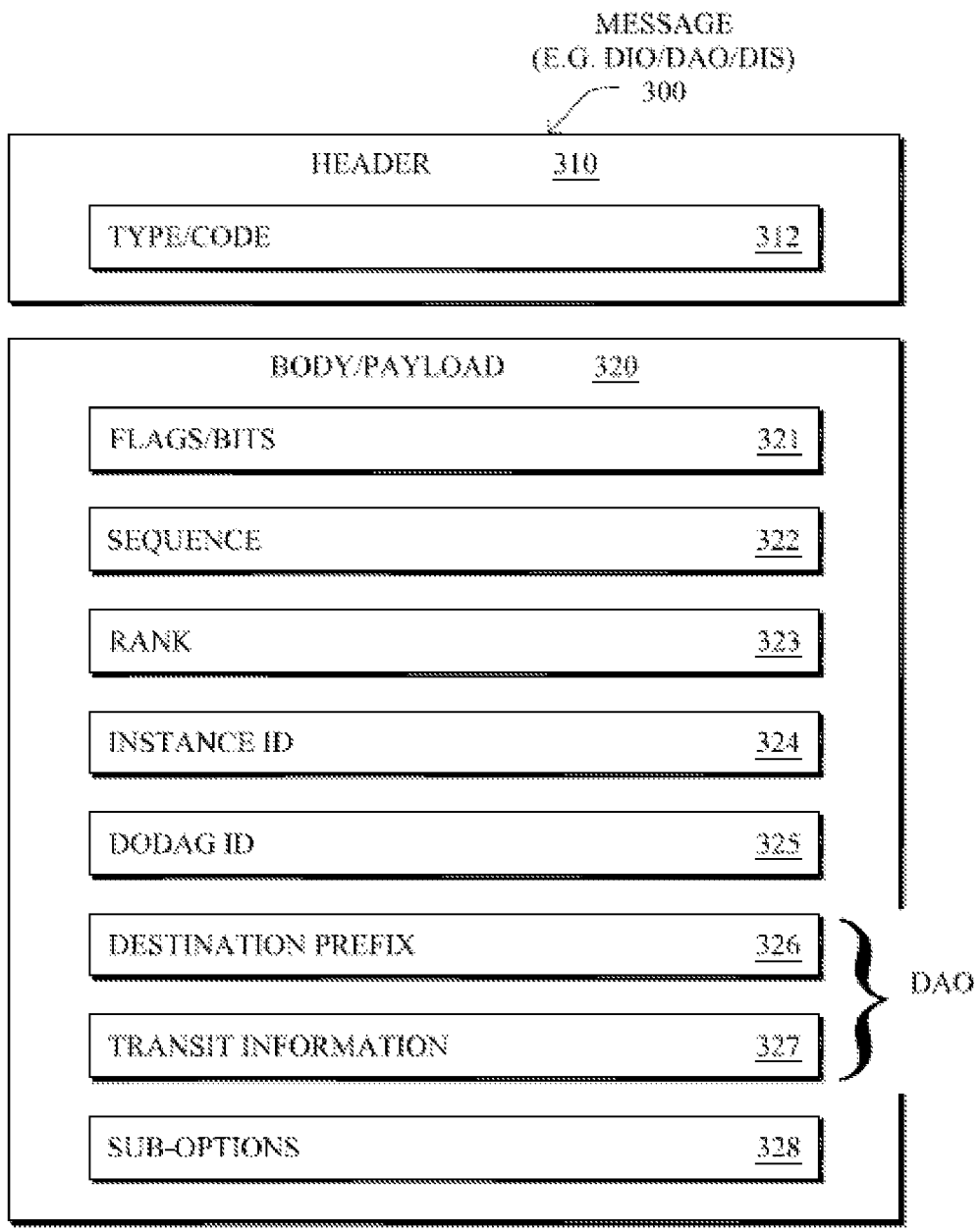
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Notably, industrial communication systems deployed today mostly use serial communications (most of them being proprietary) between sensors/actuators and a Programmable Logic Controller. Ethernet communication is also widely used for process and discrete manufacturing. For example, many SCADA (supervisory control and data acquisition) systems use Ethernet communication technologies to communicate with the Programmable Logic Controllers.

Recently with the emergence of new wireless technologies like IEEE 802.11, IEEE 802.15.4, it is becoming increasingly efficient and easy to deploy new sensors/actuators on a factory assembly line at a very low cost (e.g., no need to add wire/cable, no wire cuts, etc.), and to deploy new monitoring applications in an economically viable fashion (e.g., vents, corrosion), adding new capabilities such as automated matching flow meters along a pipe for leak detection, or lighting based on human presence for power saving, as well as allowing for applications with rotating devices, moving cranes, robots arms, or mobile handheld devices. Monitoring applications represent orders of magnitude more sensors than traditional control loops and the number of new wireless connected device deployments is growing exponentially. These new technologies have gained in robustness, stability, and security, making these deployments feasible.

However, customer requirements in the industrial space are focusing on the determinism of the network communications and their standardization, particularly since industrial networking generally requires having predictable communications between devices (e.g., a refinery's processing controls), as well as other applications, such as inflight control systems, internal vehicle connectivity, and so on. As noted above, deterministic networking refers to networks that can guarantee the delivery of packets within a bounded time. This generally translates to the following characteristics:

Guarantee of delivery;
Fixed latency; and
Jitter close to zero (micro seconds to 10 s of milliseconds depending on application).

Typically, two methods are used to meet these requirements:
Quality of Service (QOS) and 802.1Q mechanisms; and
Time scheduled mechanisms.

Both methods may be used for Ethernet or Wireless technologies. There are also techniques that combine QOS technologies with time schedules (e.g., emissions of packets on the different QOS queues being triggered by a schedule-based gate mechanism). Achieving these characteristics within the architecture of an LLN, however, is not trivial, due to the constrained nature of LLNs.

In an example embodiment, Deterministic Ethernet or Deterministic Wireless based on time-scheduled mechanisms require that all the nodes being part of a path are to be time synchronized. Each packet forwarding is then regulated by a time schedule that specifies when this specific packet has to be transmitted to the wire or the radio and this continues for each node on the path. This specific time period is called a time slot. An external box (called orchestrator) usually does the computation of this path and the associated timetable. When the computation is done, the path and the time table is then pushed to every node participating in the forwarding, such that they can receive and transmit the packet according to the schedule. In the case of Deterministic Wireless, many systems used channel-hopping functionality, and the timetable in this case should define the time slot and the frequency channel to use. Illustratively, for the 802.15.4 protocol, a specific extension to the standard has been defined: 802.15.4e "Time Slotted Channel Hopping" (TSCH). TSCH is a medium access technique, which uses time synchronization to achieve ultra low-power operation and channel hopping to enable high reliability. The Time-Slotted aspect of the TSCH technology is a Time Division Multiplexing (TDM) technique, which requires all nodes in the network to be time synchronized. Time is sliced up into time slots, which are long enough for a MAC frame of maximum size to be sent from mote (node) B to mote A, and for mote A to reply with an acknowledgment (ACK) frame indicating successful reception.

In addition, path computation elements (PCEs), as defined, for example, in the Internet Engineering Task Force's Request for Comment (RFC) 4655, generally consist of relying on an external engine (PCE) responsible for the computation of paths or tunnels in the network (e.g., a computational entity that can be hosted on a router or external server). Head-ends (or Path Computation Clients—PCCs) may send requests to PCEs (PCReq messages) using a PCEP signaling protocol (RFC 5440), and receive computed paths thanks to replies (PCRep messages). PCEP supports a variety of complex messages with priority, attributes, constraints, etc., along with IGP-based PCE discovery using OSPF and ISIS of static and dynamic attributes. Various algorithms (usually not standardized) have been specified for PCE selection and load balancing. Two forms of PCE exist: (1) Stateless (computation of paths/tunnels is memory-less and the PCE does not maintain LSP states but simply the TED (Traffic Engineering Database) for the majority of the cases; and (2) stateful where the PCE also maintains the LSP's state, which provides more optimum path computation (avoiding double booking allocation, allowing for global optimization, etc.) at the cost of additional complexity. Inter-PCE path computation has also been specified to handle the case where a single PCE would not have complete visibility of the routing domain, thus requiring some form of collaboration between PCEs to compute a path/tunnel, while preserving confidentiality between routing domains.

Notably, the PCE has generally been specified for high-bandwidth networks, such as core service provider networks. As such, PCE protocols and various mechanisms (e.g., signaling required for PCE discovery, PCC-PCE signaling protocols such as PCEP, etc.) have typically been quite heavy in terms of control plane overhead and various state maintenance. Although the overall architecture is preserved, the use of a PCE-based architecture for Deterministic Wireless requires a number of enhancements, such as new protocols and algorithms and mechanisms to operate in the highly constrained environments of LLNs, as discussed above. Furthermore the PCE has been designed to compute paths, though in the context of Deterministic Wireless, what is required is not only to compute paths, but also time slot allocation (in others words, knowing the traffic matrix, paths, and time slot allocation is intimately coupled, which changes the paradigm of routing and network operations, introducing new issues that require new mechanisms).

Efficient Network Probing

One of the major issues in constrained networks, such as deterministic wireless networks, lies in measuring whether service level agreements (SLAs) are met. In particular, network performance probing is traditionally a "heavy" protocol, requiring significant signaling and message passing in order to operated. Also, it has been difficult to properly determine a level of "overbooking", in which computed paths may reserve more bandwidth than is available on a given link, due to the likely underutilization of the link below the reserved amount. Furthermore, it has been difficult to determine whether certain path computation constraints can be relaxed to still meet the SLAs, thus allowing greater freedom and opportunities for optimized paths.

The techniques herein specify a set of probe reporting mechanisms allowing for efficient compression in the network using pre-loaded profiles and probe processing in the network itself. The techniques herein also allow PCEs to take into account the probe reports in order to dynamically adjust the level of over-booking in the network while maintaining SLAs, and to perform constraint relaxation in view of the probe reports while guaranteeing SLAs in a dynamic fashion. Notably, the techniques herein significantly contrast with current approaches where path computation and performance monitoring are strongly decoupled.

Specifically, according to one or more embodiments of the disclosure as described in detail below, a device (e.g., path computation device) informs a network management device of a plurality of possible probing profiles, where nodes of a computer network receive the plurality of possible probing profiles from the network management device. Based on determining that particular information is desired from one or more particular nodes of the nodes of the computer network, the device may then select one or more particular probing profiles of the plurality of possible probing profiles based on the particular information, and instructs the one or more particular nodes to probe one or more particular destination nodes according to the one or more particular probing profiles. As such, upon receiving instructions from a path computation device to probe one or more particular destination nodes according to one or more particular probing profiles of the plurality of possible probing profiles, the particular nodes may then probe the one or more particular destination nodes according to the one or more particular probing profiles of the instructions.

Illustratively, the techniques described herein may be performed by hardware, software, and/or firmware, such as in accordance with the "probing" process 248, which may contain computer executable instructions executed by the processor 220 to perform functions relating to the techniques described herein, e.g., in conjunction with (or as corresponding parts of) routing process 244 and PCE/PCC process 246 (which contains computer executable instructions to operate according to one or more of the PCE and/or PCC protocols described above). For example, the techniques herein may be treated as extensions to conventional protocols, such as RPL, the various PCE protocols, and/or various Operations, Administration, and Maintenance (OAM) protocols, and as such, may be processed by similar components understood in the art that execute those protocols, accordingly.

OAM, or in general probe management, is important in computer networks, but especially when determinism is required. Unfortunately, in such highly constrained networks, retrieving such reports, which is critical to determine whether SLAs are met (e.g., delay, jitter, reliability, etc.) is of the utmost importance and brings a number of challenges considering the limited network capacity. According to the embodiments described herein, therefore, probing/OAM techniques may not only be used to verify that the SLAs are met in the network, but also to perform some form of over-booking of resources (since determinism does not exclude the use of a probabilistic approach) and potentially to perform some form of constraint relaxation from the PCE (e.g., when SLAs for all required flows cannot be met).

Figure 4:
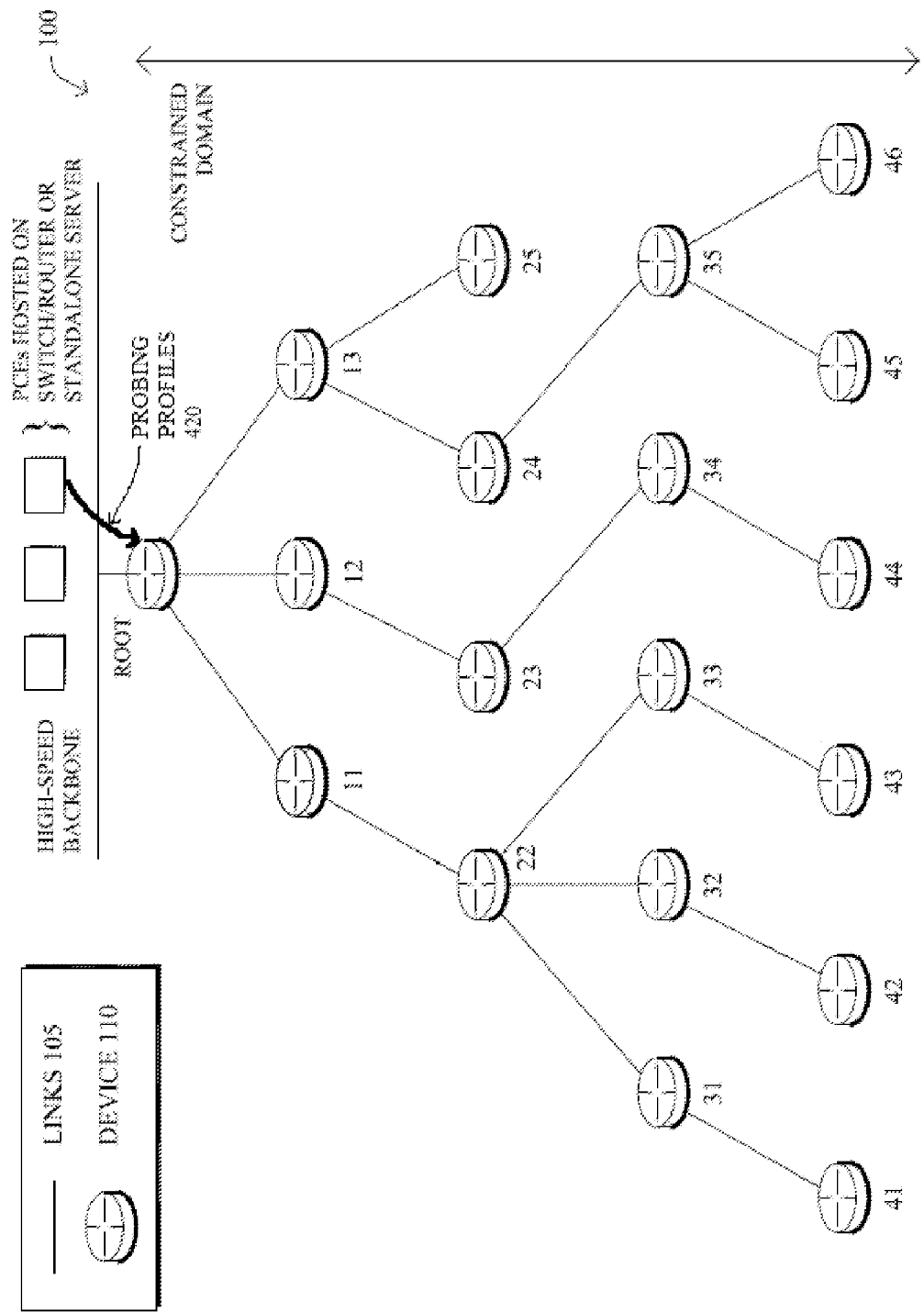
FIG. 4 illustrates an example message passing for probe profiles from a path computation element (PCE) to a network management server (NMS)

Operationally, a first aspect of the techniques herein makes use of a compressed form of probe report generation, which, illustratively, may be dynamically triggered by a PCE. In one embodiment, the originator of a probe request is the PCE (in contrast with "classic" IP networks where an NMS or NMS agent triggers the request), in order to dynamically adapt path computation in the network, as well as to schedule the triggering of probing based on the network state. To that end, the techniques herein pre-load a set of probing profiles that specify the type of required probing. In particular, instead of specifically indicating, within a probe request, the number of packets, their respective size, the frequency, and other probe characteristics (e.g., marking, header configuration, etc.) to each node upon a request, the PCE dynamically determines a set of useful "profiles" according to the particular network requirements, and then provides the profiles to an NMS (or other management device, such as a Field Area Router (FAR), root node, Dynamic Host Configuration Protocol (DHCP) server, etc.), as shown in FIG. 4 (probe profiles 420). The NMS then pre-loads the nodes with this information, such that the PCE need only indicate the particular profile to use (e.g., with a profile identifier or "ID"). As used herein, a probe profile is a set of probing characteristics (e.g., number of packets, their respective size, the frequency, and other probe characteristics (e.g., marking, header configuration, etc.)) to which any instructed probing is to conform.

Figure 5:
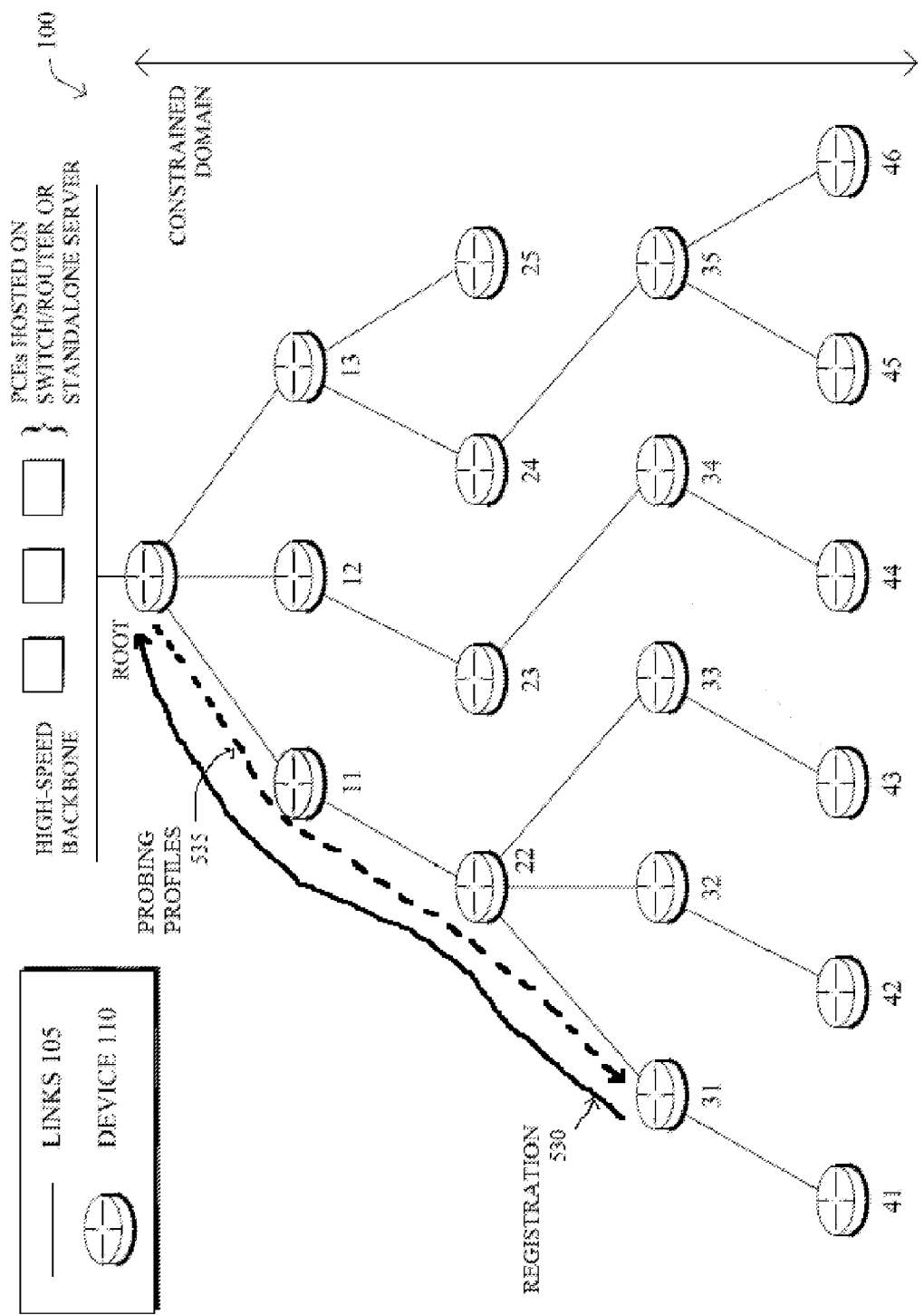
FIG. 5 illustrates an example message passing for probe profiles from the NMS to network nodes.
Figure 6:
FIG. 6 illustrates an example probe profile table.

For the sake of illustration, the PCE could dynamically determine that according to the set of routed flows in the network for which it computes paths, it makes use of three profiles for probing reports (e.g., profile P1: send X1 probes every minute with Differentiated Services Code Point (DSCP)=Y1, packet size=Z1, etc.; P2: send X2 probes every minute with DSCP=Y2, packet size=Z2, etc.; P3: send one probe once an hour with ports=W1, packet type=V1, etc.). As shown in FIG. 5, upon registration (registration 530), each device in the network would receive and pre-load such profiles 535. Furthermore, as shown in FIG. 6, the nodes may store probe profiles 620 within a table 600 (e.g., a data structure 245 within memory 240), into which a set of profile IDs 610 indexes.

Figure 7:
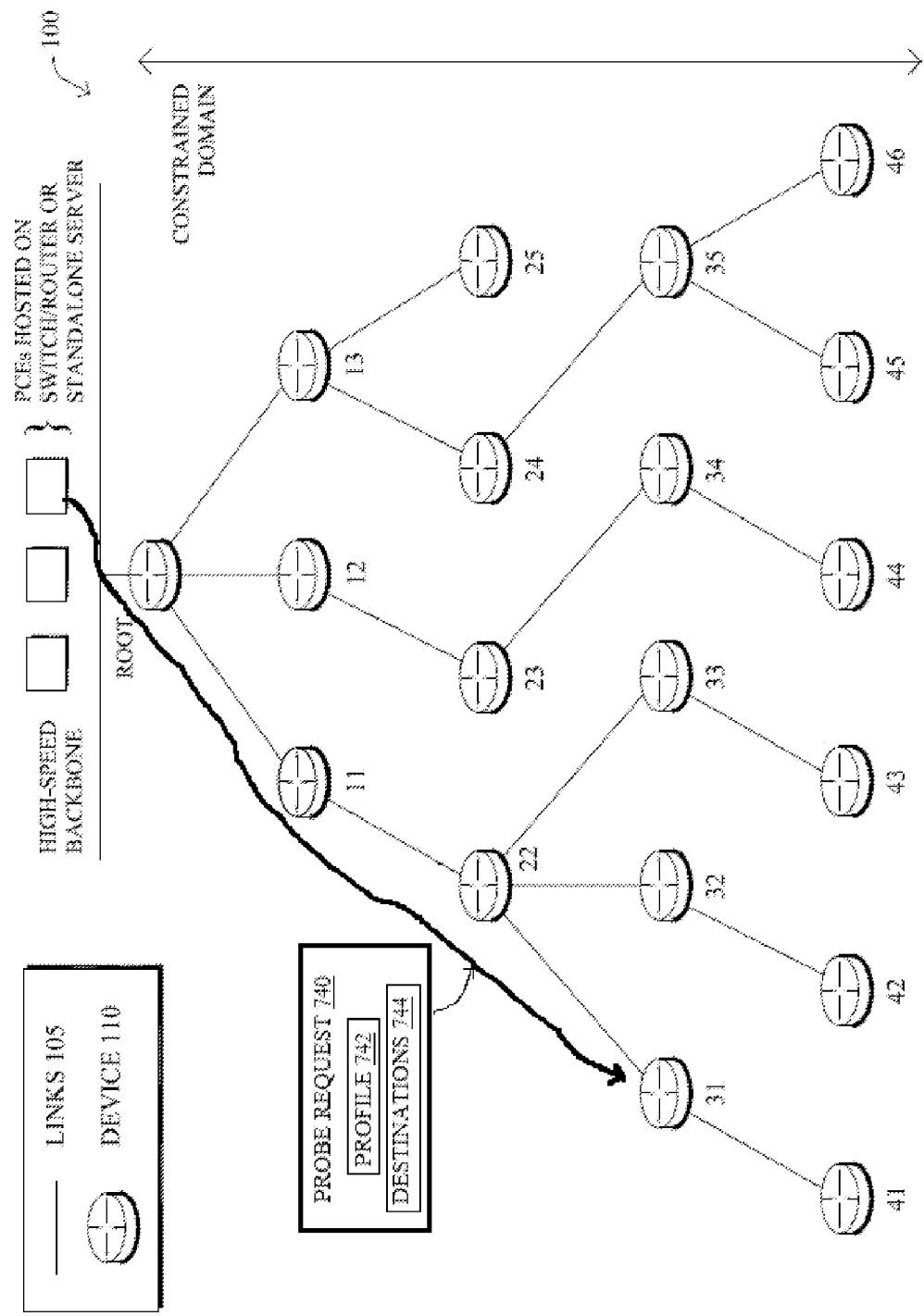
FIG. 7 illustrates an example probe request message passing.

As shown in FIG. 7, upon determining that the PCE requires probe reports based on probing from a particular node (or nodes) X to a set of nodes Y1, Y2, . . . , Yn, the PCE sends a newly defined probe request message 740 (e.g., unicast) to the node(s) X simply referring to the probing profile 742 (i.e., a profile identifier to specify a pre-loaded probe profile), in addition to the set of destinations/nodes 744 to which the probe should be sent (Y1-Yn). Note that the set of destinations could be advantageously compressed, e.g., using a bloom filter (should the set of destinations be large enough to compensate for the drawbacks of false positives) or an address set (e.g., prefix) or other indicator of groups of nodes.

Figure 8A:
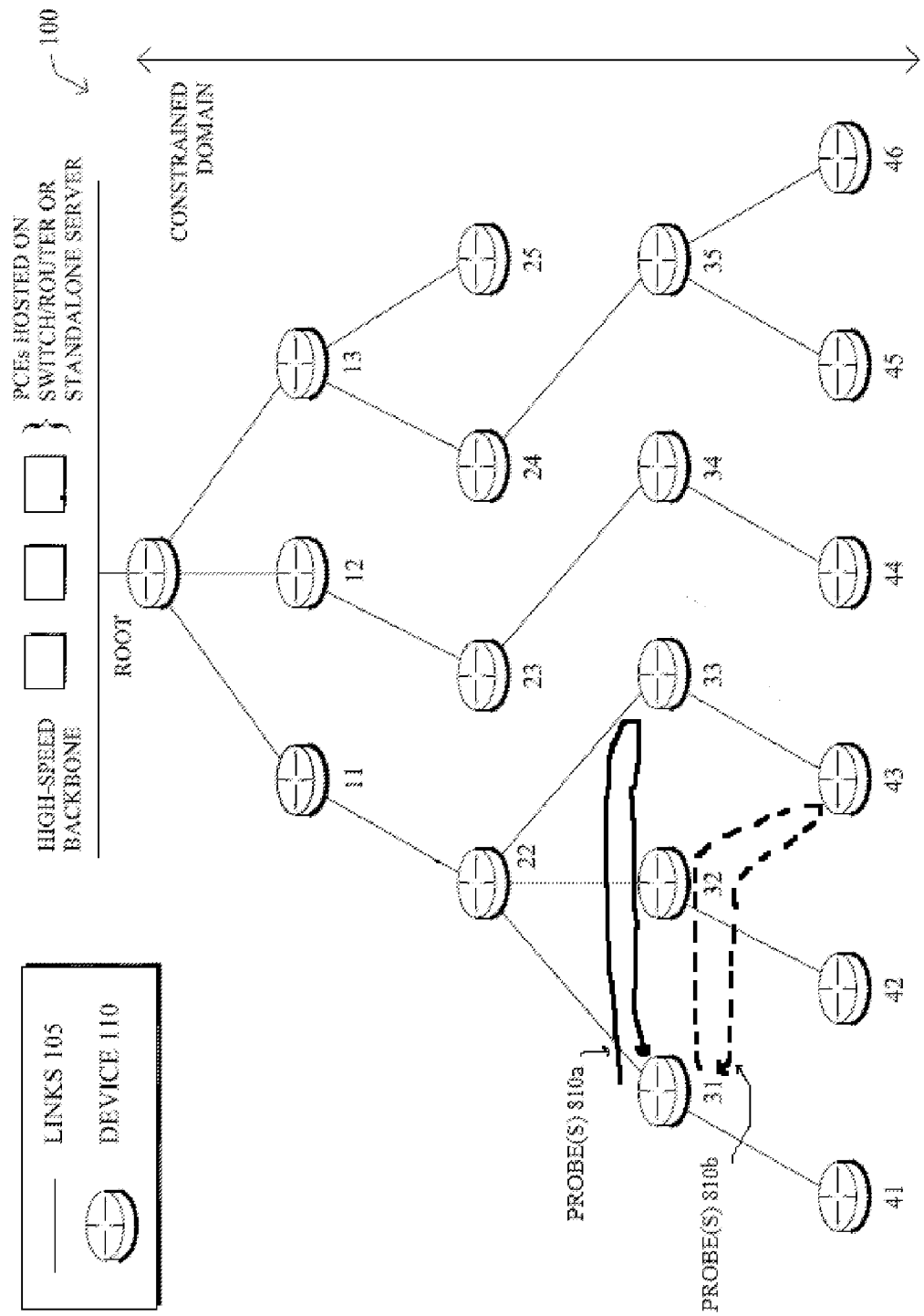
FIGS. 8A-8B illustrate an example of probing and compressed probe reports.
Figure 8B:
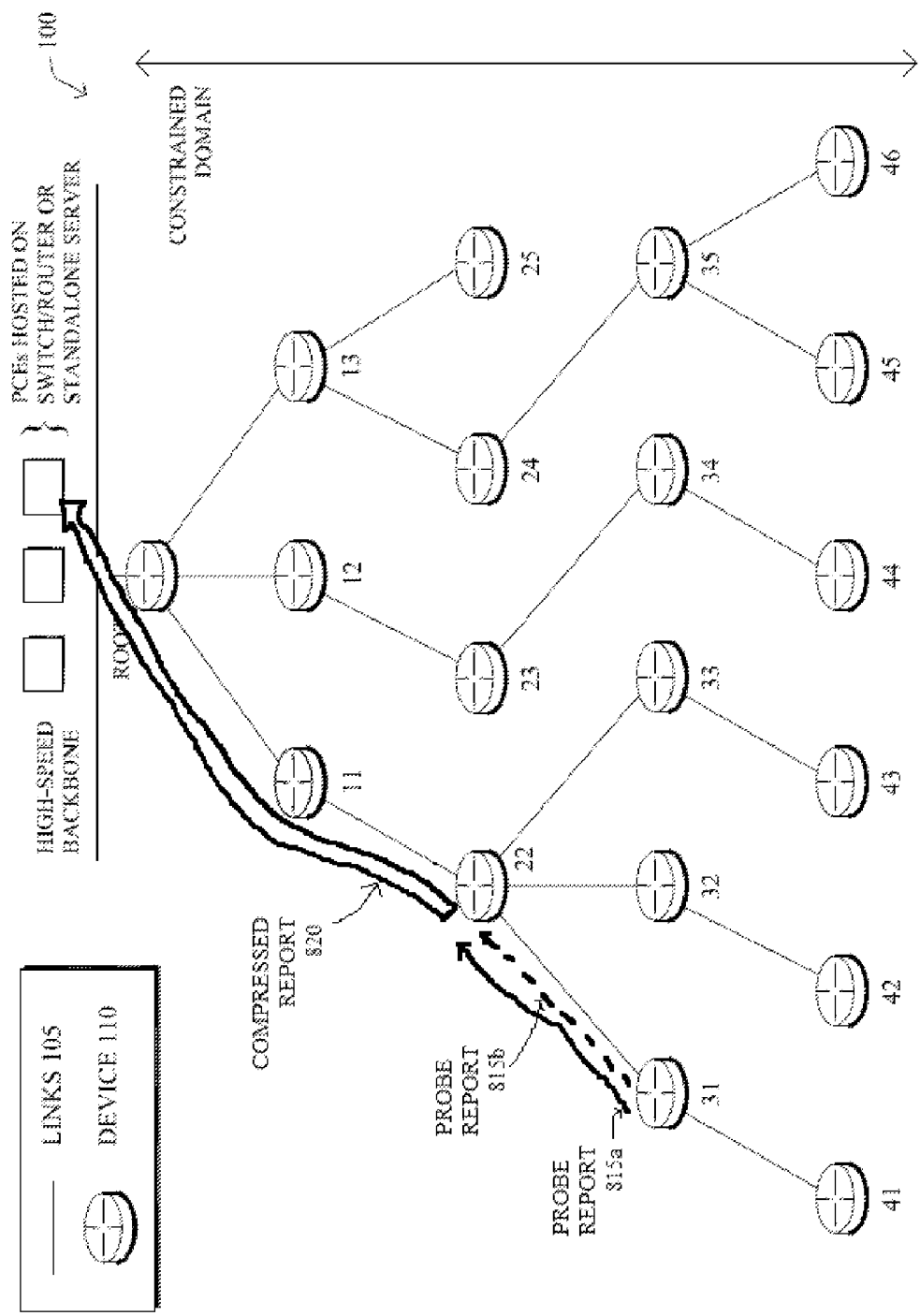

A second aspect of the techniques described herein relates to in-network processing of probe reports sent to the PCE. In particular, in many cases, it may be more efficient to avoid redundancy by compiling reports in the network itself on their way to the PCE. For example, referring first to FIG. 8A, if the PCE requires probes from the node 31 to the nodes 33 and 43 (probes 810a and 810b), and the computed paths may be respectively 31-32-33 and 31-32-43, both reports (815a and 815b) could be compressed by the node 22, as shown in FIG. 8B (compressed report 820) upon receiving probe reports from the node 31 along the computed DAG depicted in the figure, in order to avoid reporting the delay along the link 31-32 twice. (Note that node 31 may also compress the reports, and in essence, any node detecting duplicative information in the network may be configured to compress the reports.)

Figure 9A:
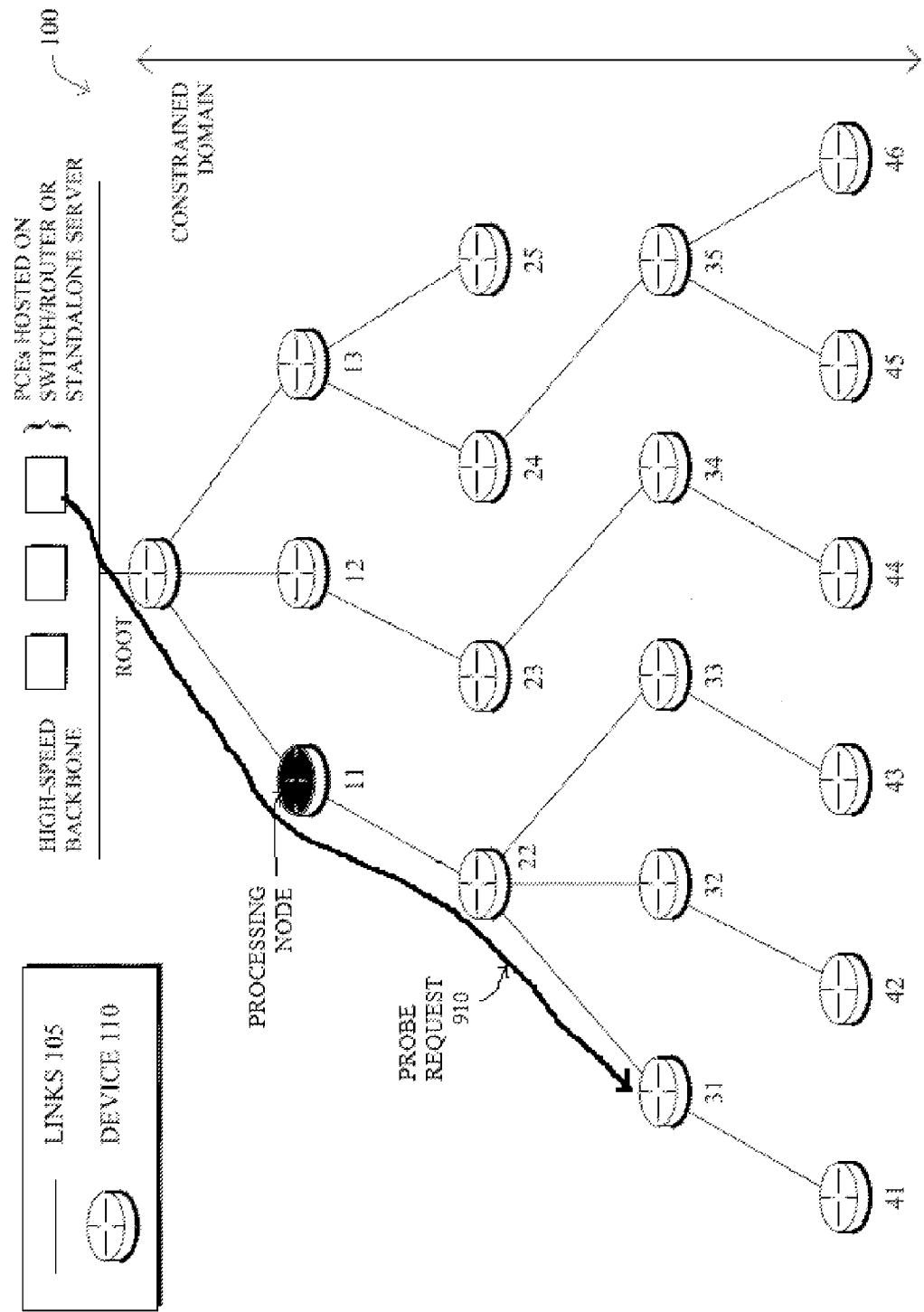
FIGS. 9A-9B illustrate another example of probing a compressed probe reports.

Similarly, when two reports are required from different nodes, paths may cross thus duplicating measures performance in the network. According to the techniques herein, therefore, a newly defined field in a unicast probe request message (e.g., generated by the PCE) may be used to specify which nodes in a network (e.g., along a DAG) that should perform OAM report processing for compression of information when transmitting the corresponding reports. For example, as shown in FIG. 9A, probe request message 910 destined to node 31 and/or 41 may inform node 11 to perform such report processing. The instructions may simply include an indication that further processing may be performed for the particular request, or else may contain greater details, such as how long to watch for such reports, etc.

Figure 9B:
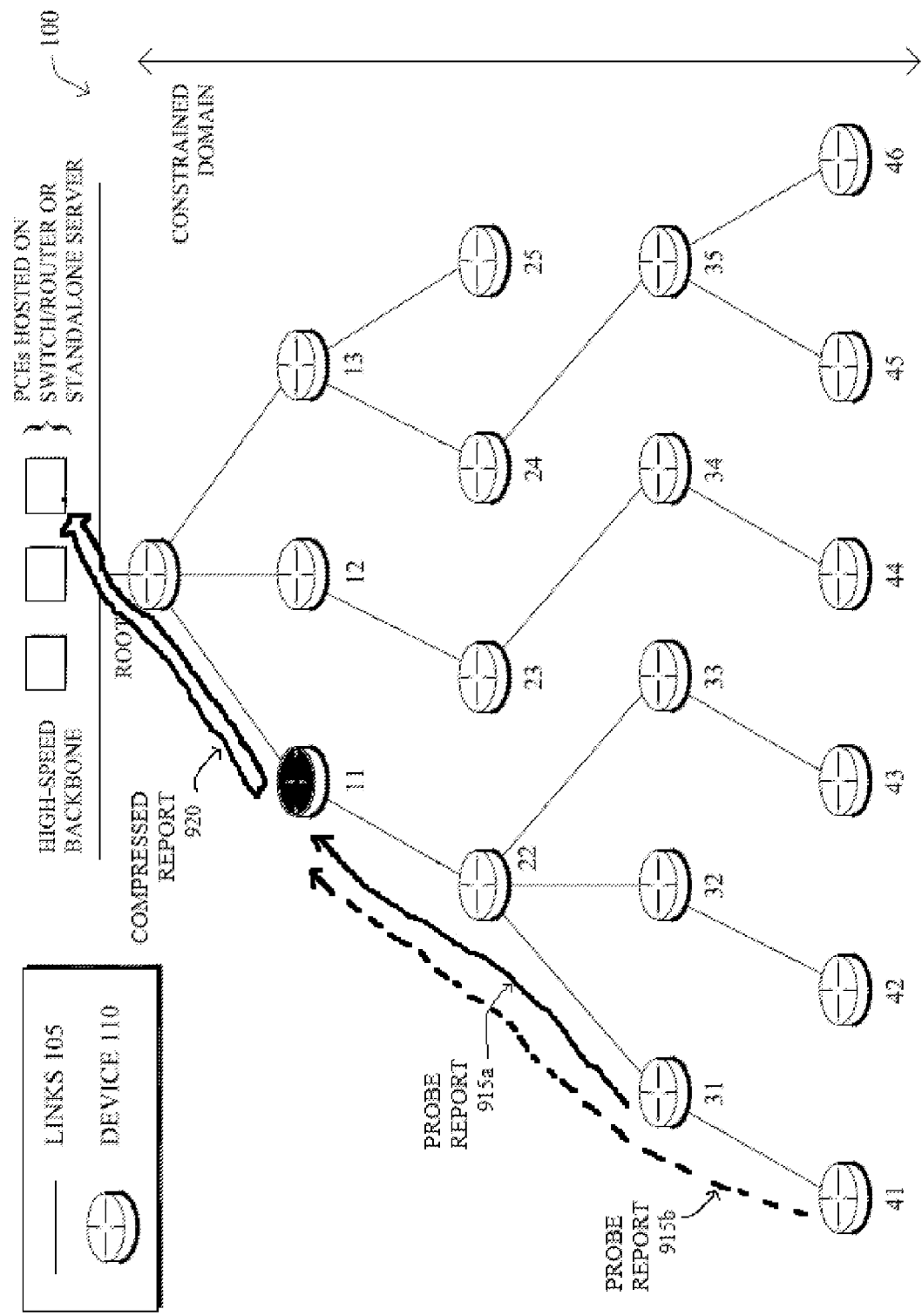

Referring then to FIG. 9B, if the node 11 sees that both nodes 31 and 41 must generate probe reports 915a and 915b, respectively, it may wait for the report of node 41 upon receiving a report of the node 31 (e.g., using the distance at which nodes lies or simply waiting to receive all reports, modulo the use of a max waiting time). For instance, in one particular embodiment, the "processing" nodes (e.g., node 11) may arm a timer when seeing the report requests according to the distance at which nodes generating probes are in the network (e.g., their rank), where the timer is used to "wait" for all reports to be received before "aggregating" report information into a compressed report 920.

In another embodiment, one or more selected network nodes may gather the probe metrics from its neighbors, and may report the aggregated information. For instance, a RPL DAG may form a dominating set (DS) of nodes that the PCE can use for routing (e.g., node 31 to 1-hop DS member node 21, then across DS members 22 and 23, then 1-hop to node 35). This concept can be extended such that the PCE could manage (e.g., control, measure, etc.) any node by asking only the DS members, which in turn ask (manage) the 1-hop neighbors in which the PCE is interested. In other words, for a number of devices that the PCE wants to measure, the PCE may compute the (NP-complete) minimal set of DS members that offer reachability to all of those devices, and then the DS in charge of a number of devices aggregates the data in order to send all the information to the PCE in a single instance (e.g., one message). In this particular manner of instructing specific nodes to compress the probing reports, network-to-PCE bandwidth is saved.

Notably, in one embodiment, probe reports in any of the above examples may be a newly defined message (e.g., IPv6 packets) or they may be piggybacked in a routing update (for example a RPL DAO messages, if RPL (RFC6550) is the protocol of use in the network). Also the path used to return probe reports to the PCE may be reserved in a deterministic fashion, particularly if the techniques are used with IPv6 TSCH (6TSCH). In particular conjunction with the DS embodiment above, the techniques may use the DS to forward the aggregated report information, where the returned probe reports use a reserved path along the DS. Note that the reservation may be performed in a RPL Resource reSerVation Protocol (RSVP) mode, as opposed to the PCE-based, in order to allow repair of the reserved path without requiring PCE participation.

A third aspect of the techniques described herein relates to the use of the received probe reports for over-booking, i.e., where some PCE-computed paths may be over-booked. For instance, determinism generally excludes the ability to perform over-booking, but it is generally well-known that some path computation algorithms have the tendency to be very conservative, leading to severely restricting the set of available resources. Also, applications may not request a proper amount of bandwidth, e.g., too much or too little, in which case reserved bandwidth may remain unused or long delays may result, respectively.

For example, in a deterministic wireless network, the PCE may decide that a set of K flows can be routed onto a link L at a time T is the sum of the required bandwidth is less that the link capacity. The techniques herein, on the other hand, introduce a feedback loop allowing for the dynamic adjustment of an overbooking factor K. Upon receiving the set of probe reports, the PCE may thus be able to determine the remaining ("leftover") capacity on each link used during the computation. For example, if in the above example the applications have reserved too little bandwidth and substantial delays are noticed in the network, the overbooking factor may be lowered to reduce congesting the network. Notably, the use of probe reports in order to dynamically adjust the overbooking factor K may be used globally or locally (different values can be tracked for each link in the network), and may or may not be controlled by the NMS. Furthermore the overbooking factor for each link may also be a factor of the criticality of the flows routed on that link. Note also, that such an approach may be used for unscheduled slots in addition to time-based slot management.

A fourth aspect of the techniques described herein lies in the use of probe reports in order to perform on-line constraint relaxation on the PCE. Indeed, one purpose of a PCE is to find an "optimal" placement of a set of paths according to the traffic matrix, required SLA, and available resources in the network. In the vast majority of the cases, such a problem is NP-Complete and requires the use of heuristic to find the closest match between the demand and the set of available resources. In a deterministic wireless network, bounds on delay/jitter/etc. make the path computation task even harder to achieve. According to the techniques herein, therefore, certain constraints may be relaxed based on the probe feedback (in contrast with current approaches where bandwidth demands are exclusively based on the initial PCC request to the PCE). In particular, the techniques herein allow the PCE to use the probe reports to determine whether the SLA (e.g., delays) is met in light of the request (e.g., bandwidth=X). This potentially allows the PCE to relax some constraints (e.g., reduce the bandwidth from X to Y), illustratively using an incremental approach, in order to free-up bandwidth and increase the resources usage in the network. Note that the PCE may not perform constraint relaxation if it is explicitly disallowed. Note also that the PCE may also notify the requester (PCC) that the constraint has been slightly relaxed, but that the SLA is still satisfied (e.g., a newly defined notification message sent by the PCE to the requester).

Said differently, probe reports received by the PCE may be used in close loop control, to dynamically affect path computation in light of the committed SLAs. For the sake of illustration, consider a set of requests R1, R2, etc. received by the PCE, and for simplification, assume that only the bandwidth of each request B1, B2, etc., is considered. If the PCE places the network flows according to a computed path, it would then use the probe reports to effectively tune the overbooking factor and/or relax constraints. For example, the PCE may determine that the flow F1 corresponding to the request R1 required B1 although based on the OAM reports generated by the originator of F1, the PCE could have computed a path providing B1'<B1. In other words, OAM reports are taken as inputs in order to potentially modify the requests if it determines that this can be done while still meeting the SLA. This thus allows highly constrained networks (e.g., requiring determinism) to adjust the constraints according to probe reports in order to optimize the network without violating SLAs. Note that this approach may also allow finding a path for a request that would have been rejected: that is, the PCE may determine, based on the probing, that a link is indeed less "booked" than it was supposed to be according to the request, thus allowing the admission of a new flow.

Figure 10:
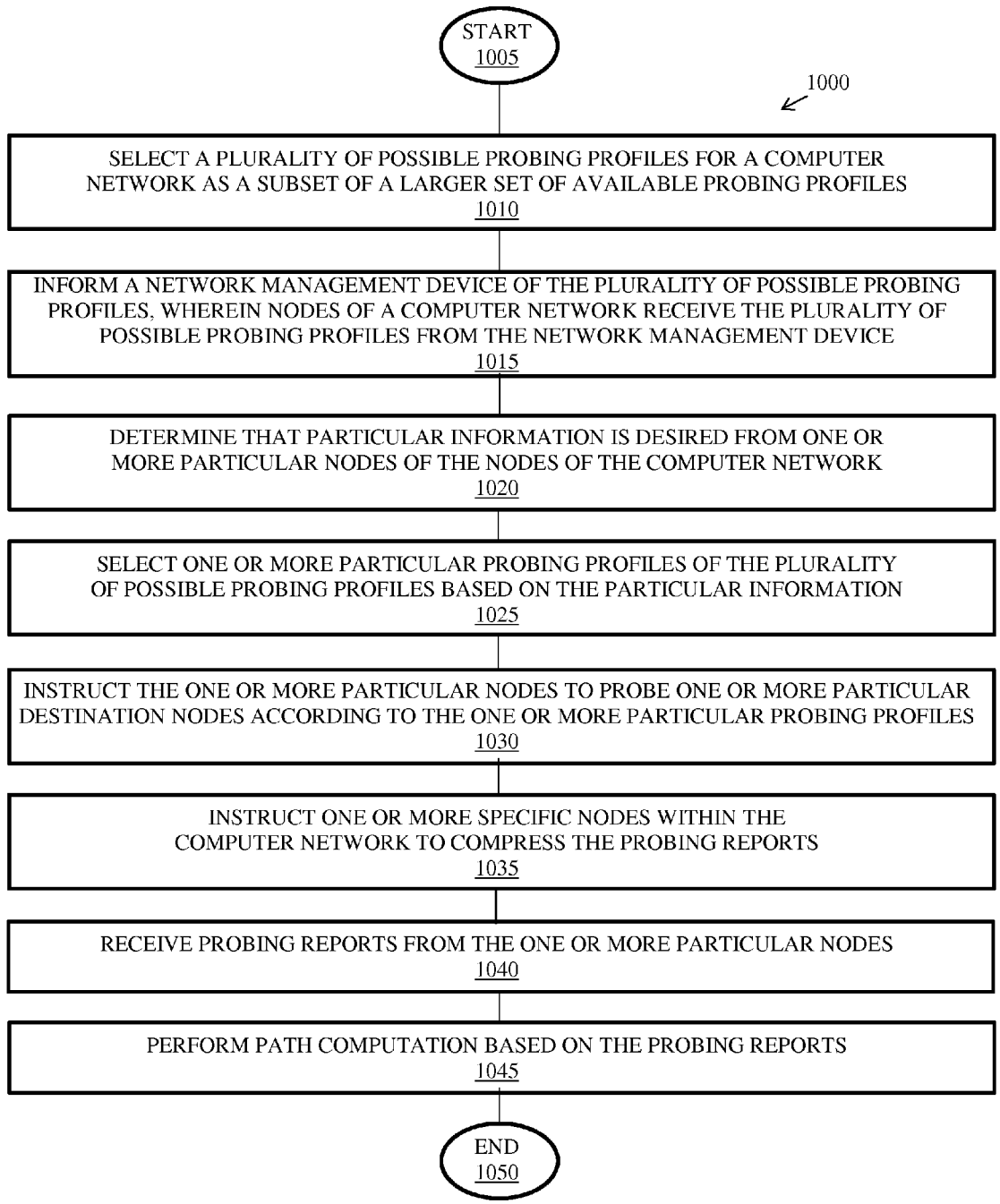
FIG. 10 illustrates an example simplified procedure for efficient network probing, particularly for deterministic wireless networks, from the perspective of a probe controlling device (e.g., PCE)

FIG. 10 illustrates an example simplified procedure 1000 for efficient network probing, particularly for deterministic wireless networks in accordance with one or more embodiments described herein, from the perspective of a probe controlling device (e.g., a path computation device). The procedure 1000 may start at step 1005, and continues to step 1010, where, as described in greater detail above, a path computation device (e.g., PCE) may select a plurality of possible probing profiles for a particular computer network as a subset of a larger set of available probing profiles, and then inform a network management device (e.g., NMS or FAR, etc.) of the plurality of possible probing profiles, where nodes of the computer network receive the plurality of possible probing profiles from the network management device (e.g., in FIG. 11, below).

Once the path computation device determines in step 1020 that particular information is desired from one or more particular nodes of the nodes of the computer network, then in step 1025 the device may select one or more particular probing profiles of the plurality of possible probing profiles based on the particular information, and as described above, instructs the one or more particular nodes in step 1030 to probe one or more particular destination nodes according to the one or more particular probing profiles. For example, the instructions may be unicasted to the one or more particular nodes, or else may be multicasted or otherwise distributed (e.g., a broadcast message with node addresses or group identifiers). Optionally, as also mentioned above, in step 1035 the path computation device may also explicitly instruct one or more specific nodes within the computer network to compress the probing reports.

Upon receiving probing reports from the one or more particular nodes in step 1040 (e.g., unicasted reports or reports piggybacked on a routing protocol message), then in step 1045 the path computation device may perform path computation based on the probing reports, accordingly. For instance, as described above, the path computation may adjust overbooking of one or more links within the computer network based on the probing reports (e.g., adjusted either globally to all links of the computer network or locally to one or more specific links of the computer network, and/or based on a criticality of respective per-link traffic flows). Alternatively or in addition, if allowed by a path computation requesting device (e.g., PCC) or otherwise network policy based, path computation may be allowed to relax path computation constraints based on the probe reports (e.g., incrementally based on subsequent probing reports). In one embodiment, if the path computation constraints are relaxed, the path computation device may (though need not, depending on configuration) inform the path computation requesting device of the relaxing, and that the relaxing is acceptable based on the probing reports.

The procedure 1000 illustratively ends in step 1050, though notably maintains the ability to return to any step in FIG. 10, such as to request further probing using the probing profiles, performing further path computation based on the probe reports, etc. Note also that the probing profiles may be updated and pushed to the network nodes of the network.

Figure 11:
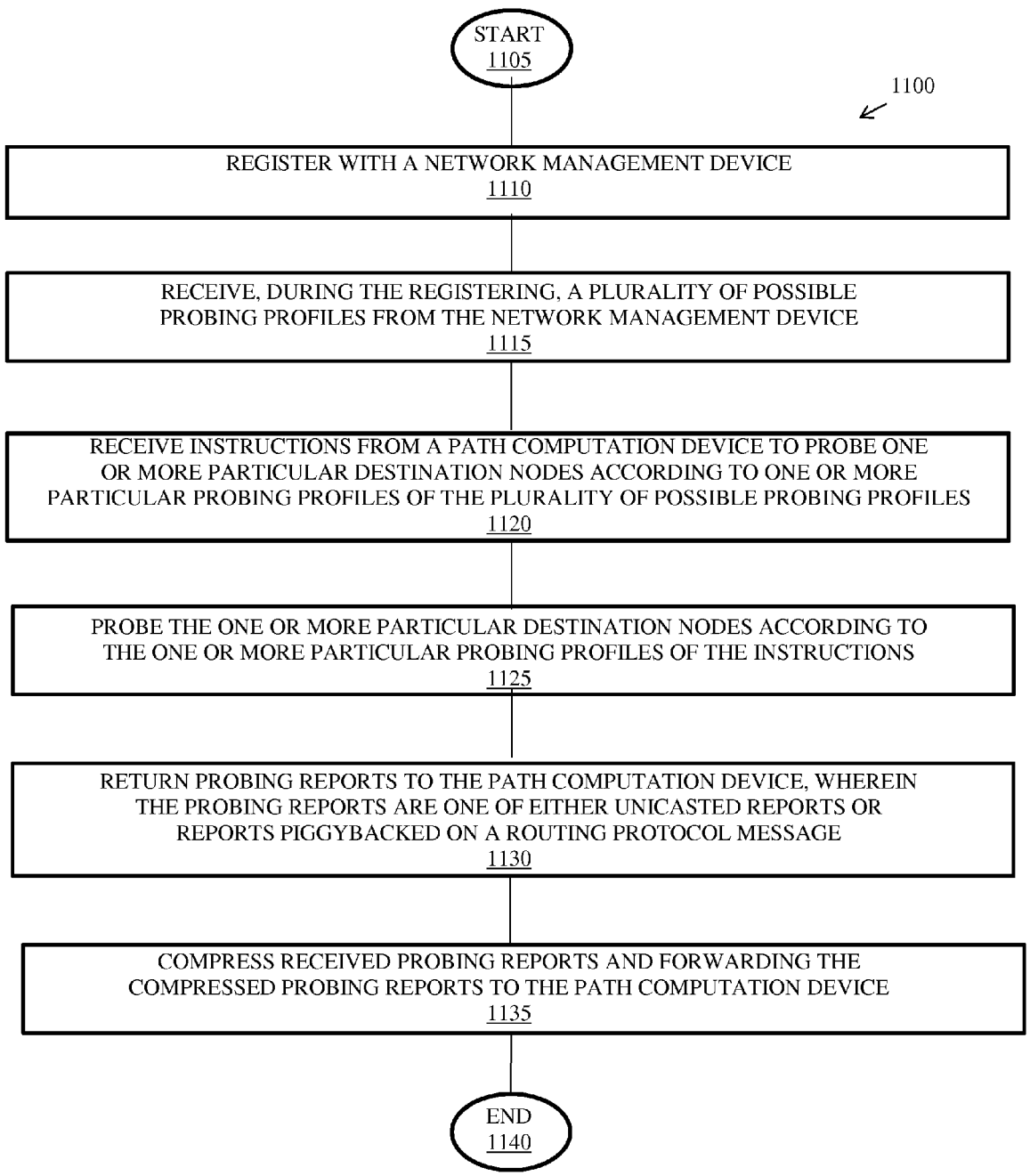
FIG. 11 illustrates an example simplified procedure for efficient network probing, particularly for deterministic wireless networks, from the perspective of a probing device (e.g., network node).

In addition, FIG. 11 illustrates an example simplified procedure 1100 for efficient network probing, particularly for deterministic wireless networks in accordance with one or more embodiments described herein, from the perspective of a probing device (e.g., network node). The procedure 1100 may start at step 1105, and continues to step 1110, where, as described in greater detail above, the probing device (node) registers with a network management device (e.g., NMS, FAR, etc.), and in turn in step 1115 receives, during the registering, a plurality of possible probing profiles from the network management device. Accordingly, upon receiving instructions from a path computation device in step 1120 to probe one or more particular destination nodes according to one or more particular probing profiles of the plurality of possible probing profiles, the probing device may probe the one or more particular destination nodes according to the one or more particular probing profiles of the instructions in step 1125, as described above.

In step 1130, the probing device returns corresponding probing reports to the path computation device (e.g., uncasted reports or reports piggybacked on a routing protocol message). Notably, in step 1135, network devices (including but not limited to the probing device) may compress received probing reports and forward the compressed probing reports to the path computation device, such as by waiting to receive a known plurality of probing reports or a particular time prior to compressing the received probing reports (where the received probing reports may be received from a same probing node or different probing nodes, as mentioned above). The procedure 1100 may then end in step 1140, with the noted option to receive further probing instructions, updates to the probing profiles (e.g., via routing protocol updates), and so on.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, provide for efficient network probing, particularly for deterministic wireless networks. In particular, by using pre-loaded OAM configuration probing profiles and in-network OAM report processing, the techniques herein allow for more efficient OAM/probe reporting in a constrained network. Additionally, by using the OAM reports to dynamically adjust path computation, levels of over (or under) booking, and constraint relaxation (compared to the original requests), the techniques also increase network resource usage through careful overbooking and accepting more flows while still guaranteeing the SLA in a deterministic wireless network.

While there have been shown and described illustrative embodiments that provide for efficient network probing, particularly for deterministic wireless networks, it is to be understood that various other adaptations and modifications may be made within the spirit and scope of the embodiments herein. For example, the embodiments have been shown and described herein with relation to deterministic wireless networks. However, the embodiments in their broader sense are not as limited, and may, in fact, be used with other types of networks and/or protocols, constrained or not. In addition, while certain protocols are shown, and specific references made to OAM techniques, other suitable protocols that make use of probing in the manner described above may be used, accordingly. In particular, though the techniques perform operation (monitoring the network), administration (keeping track of resources being used in the network), and maintenance (dynamically adjusting the overbooking factor, relaxing constraints, or other corrective and/or preventive measures to make the managed network run more effectively), the techniques are not limited to the common understanding of OAM techniques and protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   informing, by a path computation device, a network management device of a plurality of possible probing profiles, wherein nodes of a computer network receive the plurality of possible probing profiles from the network management device;
   determining, by the path computation device, that particular information is desired from one or more particular nodes of the nodes of the computer network;
   selecting, by the path computation device, one or more particular probing profiles of the plurality of possible probing profiles based on the particular information, the one or more particular probing profiles specifying a type of probing that is required;
   instructing, by the path computation device, the one or more particular nodes to probe one or more particular destination nodes according to the one or more particular probing profiles;
   receiving probing reports from the one or more particular nodes;
   adjusting overbooking of one or more links within the computer network based on the probing reports; and
   relaxing path computation constraints at the path computation device based on the probing reports.

2. The method as in claim 1, further comprising:
   selecting the plurality of possible probing profiles for the computer network as a subset of a larger set of available probing profiles.

3. The method as in claim 1, wherein instructing comprises:
   unicasting instructions to the one or more particular nodes.

4. The method as in claim 1, further comprising:
   receiving probing reports from the one or more particular nodes.

5. The method as in claim 4, further comprising:
   instructing one or more specific nodes within the computer network to compress the probing reports.

6. The method as in claim 4, wherein the received probing reports are one of either unicasted reports or reports piggybacked on a routing protocol message.

7. The method as in claim 1, wherein the overbooking is adjusted either globally to all links of the computer network or locally to one or more specific links of the computer network.

8. The method as in claim 1, further comprising:
   adjusting the overbooking of each of the one or more links based on criticality of respective per-link traffic flows.

9. The method as in claim 1, further comprising:
   incrementally relaxing the path computation constraints based on subsequent probing reports.

10. The method as in claim 1, further comprising:
    relaxing the path computation constraints only when allowed by a corresponding path computation requesting device.

11. The method as in claim 1, further comprising:
informing a path computation requesting device of the relaxing of the path computation constraints and that the relaxing is acceptable based on the probing reports.

12. An apparatus, comprising:
one or more network interfaces;
a processor coupled to the network interfaces and adapted to execute one or more processes; and
a memory configured to store a process executable by the processor, the process when executed operable to:
inform a network management device of a plurality of possible probing profiles, wherein nodes of a computer network receive the plurality of possible probing profiles from the network management device;
determine that particular information is desired from one or more particular nodes of the nodes of the computer network;
select one or more particular probing profiles of the plurality of possible probing profiles based on the particular information, the one or more particular probing profiles specifying a type of probing that is required;
instruct the one or more particular nodes to probe one or more particular destination nodes according to the one or more particular probing profiles;
receive probing reports from the one or more particular nodes as a path computation device;
adjust overbooking of one or more links within the computer network based on the probing reports; and
relax path computation constraints based on the probing reports,
wherein the apparatus is a path computation device.

13. The apparatus as in claim 12, wherein the process when executed is further operable to:
select the plurality of possible probing profiles for the computer network as a subset of a larger set of available probing profiles.

14. A method, comprising:
registering with a network management device;
receiving, during the registering, a plurality of possible probing profiles from the network management device;
receiving instructions from a path computation device to probe one or more particular destination nodes according to one or more particular probing profiles of the plurality of possible probing profiles, the one or more particular probing profiles specifying a type of probing that is required;
probing the one or more particular destination nodes according to the one or more particular probing profiles of the instructions;
returning probing reports to the path computation device; and
receiving updated probing instructions based on the probing reports received at the path computation device,
wherein the updated probing instructions are received when the path computation device adjusts overbooking of one or more links within the computer network based on the probing reports, and
wherein the updated probing instructions are received when the path computation device relaxes path computation constraints based on the probing reports.

15. The method as in claim 14, further comprising:
wherein the probing reports are one of either unicasted reports or reports piggybacked on a routing protocol message.

16. The method as in claim 14, further comprising:
compressing received probing reports; and
forwarding the compressed probing reports to the path computation device.

17. The method as in claim 16, further comprising:
waiting to receive a known plurality of probing reports prior to compressing the received probing reports.

18. The method as in claim 16, wherein the received probing reports are received from either a same probing node or different probing nodes.

19. An apparatus, comprising:
one or more network interfaces;
a processor coupled to the network interfaces and adapted to execute one or more processes; and
a memory configured to store a process executable by the processor, the process when executed operable to:
register with a network management device;
receive, during the registering, a plurality of possible probing profiles from the network management device;
receive instructions from a path computation device to probe one or more particular destination nodes according to one or more particular probing profiles of the plurality of possible probing profiles, the one or more particular probing profiles specifying a type of probing that is required;
probe the one or more particular destination nodes according to the one or more particular probing profiles of the instructions;
return probing reports to the path computation device; and
receive updated probing instructions based on the probing reports received at the path computation device,
wherein the updated probing instructions are received when the path computation device adjusts overbooking of one or more links within the computer network based on the probing reports, and
wherein the updated probing instructions are received when the path computation device relaxes path computation constraints based on the probing reports.

* * * * *